(12) United States Patent
Provo et al.

(10) Patent No.: US 7,752,174 B2
(45) Date of Patent: Jul. 6, 2010

(54) COMPUTER SERVER SYSTEM INCLUDING A DATABASE POOL MODULE PROVIDING DATABASE CONNECTIVITY RECOVERY FEATURES AND RELATED METHODS

(75) Inventors: Nathan Provo, Ravensdale, WA (US); Harshad N. Kamat, Maple Valley, WA (US)

(73) Assignee: Teamon Systems, Inc., Issaquah, WA (US)

( * ) Notice: Subject to any disclaimer, the term of this patent is extended or adjusted under 35 U.S.C. 154(b) by 227 days.

(21) Appl. No.: 11/548,362

(22) Filed: Oct. 11, 2006

(65) Prior Publication Data
US 2008/0104138 A1    May 1, 2008

(51) Int. Cl.
G06F 17/30 (2006.01)
(52) U.S. Cl. .................. 707/674; 707/675; 707/676; 707/678; 707/679; 707/680
(58) Field of Classification Search .............. 707/1, 707/10
See application file for complete search history.

(56) References Cited

U.S. PATENT DOCUMENTS

| | | | | |
|---|---|---|---|---|
| 6,279,042 | B1 * | 8/2001 | Ouchi | 709/240 |
| 6,950,848 | B1 | 9/2005 | Yousefi'zadeh | 709/203 |
| 2004/0220895 | A1 * | 11/2004 | Carus et al. | 707/1 |
| 2006/0075405 | A1 | 4/2006 | Sinha | 718/100 |
| 2006/0112297 | A1 | 5/2006 | Davidson | 714/2 |
| 2006/0173866 | A1 * | 8/2006 | Newport | 707/100 |

FOREIGN PATENT DOCUMENTS

WO   WO2004/036344   4/2004

OTHER PUBLICATIONS

Mullins, *The DBA Corner: Dealing with Downtime*, Jan. 2002, available at www.craigmullins.com.
Lai, Survey: Hardware, Not Hackers, Usually Causes Oracle Database Downtime, Jun. 21, 2006, available at www.computerworld.com.

* cited by examiner

*Primary Examiner*—Baoquoc N To
(74) *Attorney, Agent, or Firm*—Allen, Dyer, Doppelt, Milbrath & Gilchrist, P.A.

(57) ABSTRACT

A computer server system may include a plurality of database modules for storing user data for a plurality of users, and at least one processing module comprising a plurality of processing threads for processing jobs for users based upon respective user data. The computer server system may further include a database pool module connected between the plurality of database modules and the at least one processing module. The database pool module may be for selectively connecting the processing threads to corresponding database modules including respective user data for jobs to be processed, and determining when a database module becomes unresponsive and terminating processing thread connections to the unresponsive database module based thereon. The database pool module may also be for determining when the unresponsive database module becomes responsive and restoring processing thread connectivity thereto based thereon.

24 Claims, 5 Drawing Sheets

COMPUTER SERVER SYSTEM INCLUDING A DATABASE POOL MODULE PROVIDING DATABASE CONNECTIVITY RECOVERY FEATURES AND RELATED METHODS

FIELD OF THE INVENTION

The present invention relates to the field of computer server systems and, more particularly, to server systems using databases for storing user data and related methods

BACKGROUND OF THE INVENTION

Databases are widely used for facilitating data organization and access. As electronic commerce continues to grow, so too does the need for robust databases that are always on and always available to prospective users. For example, many Internet-based merchants rely on database systems to provide product information and track customer orders, inventory, and other important information. Downtime for such databases means lost sales and, thus, lost revenues for the merchants.

Databases are also used for more than just product sales. Communications systems, such as electronic mail (email systems), that route data across the Internet also rely on databases to store user account information to determine the appropriate parameters for sending data to a given users. For example, an email relay system may include a mail user agent (MUA), which is an application that uses a technique called polling to relay messages from the mail server to the mail program at a user's computer or mobile wireless communications device. A MUA is a program running either on a user's personal computing device (mobile or stationary), or on a shared email relay server that checks for new mail on behalf of a multitude of such users. More particularly, polling is the retrieval of incoming messages from other users at the mail server and delivery of these messages to the user's mailbox. Particularly in the case of an email relay server, it is important that the databases which maintain email data (e.g., account information, lists of previously received emails, etc.) for respective users be constantly available so that email forwarding can continue without interruption.

Various approaches are sometimes used to help keep database downtime to a minimum. In an article by Mullins entitled "Dealing with Downtime," from Database Trends and Applications, January 2002, the author notes that database outages take one of two forms, namely planned or unplanned. Planned outages are typically for the purposes of database maintenance, upgrades, etc., while unplanned outages result from causes such as disasters, hardware failures, and operating system crashes. Mullins notes that planned outages typically account for a greater percentage of database downtime, and thus describes potential proactive techniques to reduce the time that a database has to be offline for planned outages.

While such techniques may help mitigate planned database outages, the typical approach for dealing with unplanned outages is more reactive than proactive. That is, database administrators often end up waiting until an unexpected database problem occurs and then attempt to analyze and repair the problem on the fly. However, this requires that the appropriate personnel be available when such events occur, which may not always immediately be the case. Even when it is, it may take a significant amount of time to isolate the cause of such a problem so that it can be corrected. As such, it may be desirable in certain database applications to have a more proactive approach to mitigating the effects of unexpected database downtime.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in different embodiments.

Generally speaking, a computer server system is disclosed herein which may include a plurality of database modules for storing user data for a plurality of users, and at least one processing module comprising a plurality of processing threads for processing jobs for users based upon respective user data. The server system may further include a database pool module connected between the plurality of database modules and the at least one processing module. More particularly, the database pool module may be for selectively connecting the processing threads to corresponding database modules including respective user data for jobs to be processed, and determining when a database module becomes unresponsive and terminating processing thread connections to the unresponsive database module based thereon. The database pool module may also be for determining when the unresponsive database module becomes responsive and restoring processing thread connectivity thereto based thereon.

More particularly, the processing threads may process user electronic mails (email) jobs. Furthermore, the database modules may comprise email database modules, for example. Also, the database pool module may advantageously continue to selectively connect the processing threads to responsive database modules while the unresponsive database module remains unresponsive. The database pool module may further initiate a recovery process for the unresponsive database module.

The database pool module may determine when the unresponsive database module becomes responsive by connecting a connectivity test processing thread to the unresponsive database moduler and determining if the connection for the connectivity test processing thread is released by the unresponsive database. Furthermore, the database pool module may determine database module unresponsiveness based upon a connection timeout threshold. By way of example, the connection timeout threshold may be greater than about three minutes.

A communications system may include a server system, such as the one described briefly above, as well as a wireless communications network and a plurality of wireless communications devices. Each wireless communications device may be associated with a respective user for receiving job results from said processing threads via said wireless communications network.

A method aspect is for accessing a plurality of database modules for storing user data for a plurality of users. The method may include providing a plurality of processing threads for processing jobs for users based upon respective user data, and selectively connecting processing threads to corresponding database modules including respective user data for jobs to be processed. The method may further include determining when a database module becomes unresponsive and terminating processing thread connections to the unresponsive database module based thereon, and determining when the unresponsive database module becomes responsive and restoring processing thread connectivity thereto based thereon.

A related computer-readable medium may have computer-executable modules including a plurality of database modules for storing user data for a plurality of users, and at least one processing module comprising a plurality of processing threads for processing jobs for users based upon respective user data. The computer-readable medium may further include a database pool module connected between said plurality of database modules and said at least one processing module. The database pool module may be for selectively connecting said processing threads to corresponding database modules including respective user data for jobs to be processed, determining when a database module becomes unresponsive and terminating processing thread connections to said unresponsive database module based thereon, and determining when said unresponsive database module becomes responsive and restoring processing thread connectivity thereto based thereon.

Figure 1:
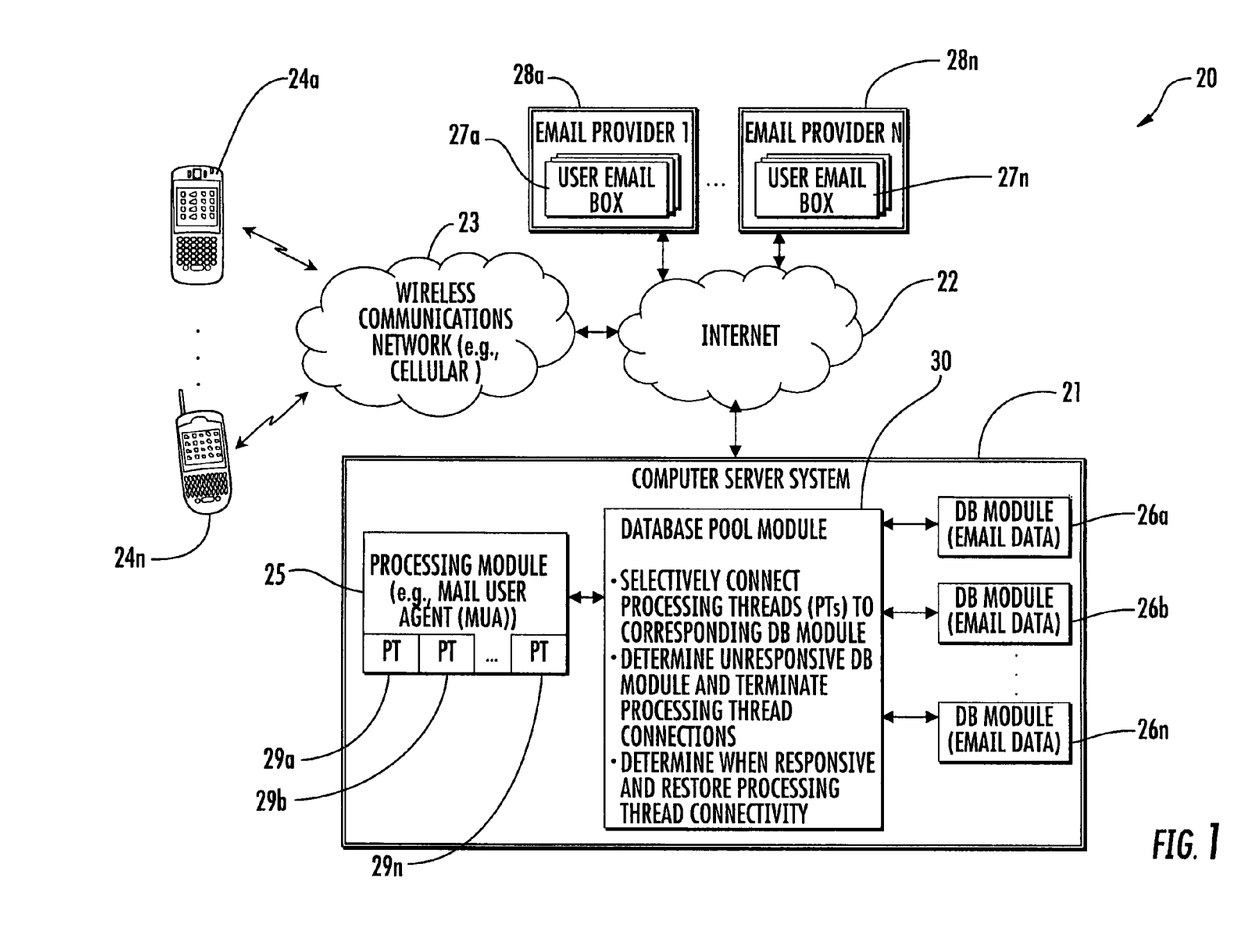
FIG. 1 is a schematic block diagram of a communications system in accordance with one exemplary embodiment including a computer server system

Referring initially to FIG. 1, a wireless communications system 30 illustratively includes a computer server system 21 connected to the Internet 22. A wireless communications network 23, such as a cellular network, for example, is also illustratively connected to the Internet 22, and a plurality of wireless communications devices 24a-24n communicate via the wireless communications network, as will be appreciated by those skilled in the art. It should be noted that other types of wireless communications networks may be used, such as a wireless local area network (LAN), for example. Moreover, more than one such network may also be used, although a single network is shown for clarity of illustration.

In the illustrated example, the wireless communications devices 24a-24n are email capable devices that are associated with a respective user and can send and receive emails via the wireless communications network 23 and the Internet 22, as will also be understood by those skilled in the art. The computer server system 21 in the present example is an email relay server that illustratively includes a processing module 25 which functions as a mail user agent (MUA) for forwarding emails from respective user email boxes 27a-27n on email provider systems 28a-28n (e.g., ISP or corporate email providers) to corresponding wireless communications devices 24a-24n. However, in other embodiments the computer server system 21 and processing module 25 may be used for processing other types of jobs and forwarding the job results to the wireless communications devices 24a-24n. Moreover, job results need not be provided to the wireless communications devices 24a-24n in all embodiments. By way of example, the computer server system could be used as an e-commerce Web server for processing e-commerce jobs (purchases, etc.) for users via Internet 22.

The processing module 25 illustratively includes a plurality of processing threads 29a-29n for processing jobs (i.e., email jobs) for users based upon respective user data stored in database modules 26a-26n. In particular, the database modules 26a-26n may each support a certain number of system users and store pertinent information for sending emails to the wireless communications devices 24a-24n for the users from the user email boxes 27a-27n. By way of example, several thousand (or tens of thousands) users may be assigned to a given database module 26.

By way of example, the database modules 26a-26n may store user account information, which may include email addresses, login identification and password information for the email accounts hosted by the email providers 28a-28n. Moreover, the modules 26a-26n may also store corresponding device identification information for use in directing forwarded emails to the appropriate devices 24a-24n, such as PIN and International Mobile Equipment Identity (IMEI) numbers, as will be understood by those skilled in the art. Additionally, the database modules may also store copies of previously retrieved/forwarded emails or lists thereof for comparison with emails in the user email boxes 27a-27n for periodically detecting new emails in the boxes, for example. Of course, the database modules 26a-26n may be used for storing other types of data in different embodiments.

As discussed above, database modules or partitions are sometimes unexpectedly subject to failures or outages. In the case of an email relay system that forwards potentially millions of emails a day, an outage of the entire system due to database failure could result in an very large amount of backlogged or potentially lost email traffic. For example, if one or more of the database modules 26a-26n was subject to an outage, processing threads 29a-29n attempting to access the affected email module(s) would be tied up until the database connection ultimately timed out. This, in turn, could result in a severe system slow down or crash in a worst-case scenario.

Accordingly, to mitigate the effects of a database module 26 that is subject to a failure or outage, the computer server system 21 further illustratively includes a database pool module 30. More particularly, the database pool module 30 is illustratively connected between the plurality of database modules 26a-26n and the processing module 25. Generally speaking, the database pool module 30 manages connections between the processing threads 29a-29n and the database modules 26a-26n so that large numbers of processing threads do not get tied up waiting for a database module that is experiencing an outage.

Figure 2:
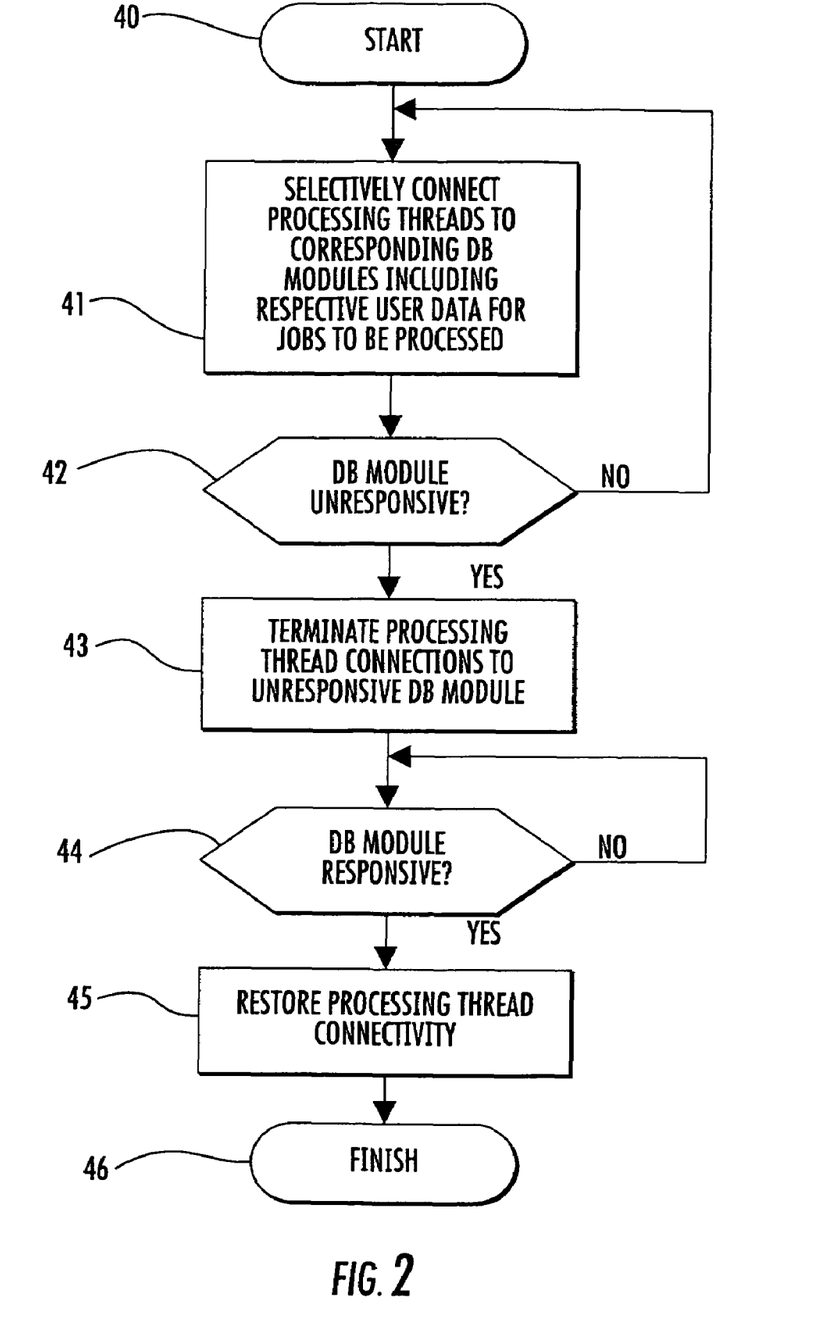
FIGS. 2 and 3 are schematic block diagrams of exemplary method aspects.
Figure 3:
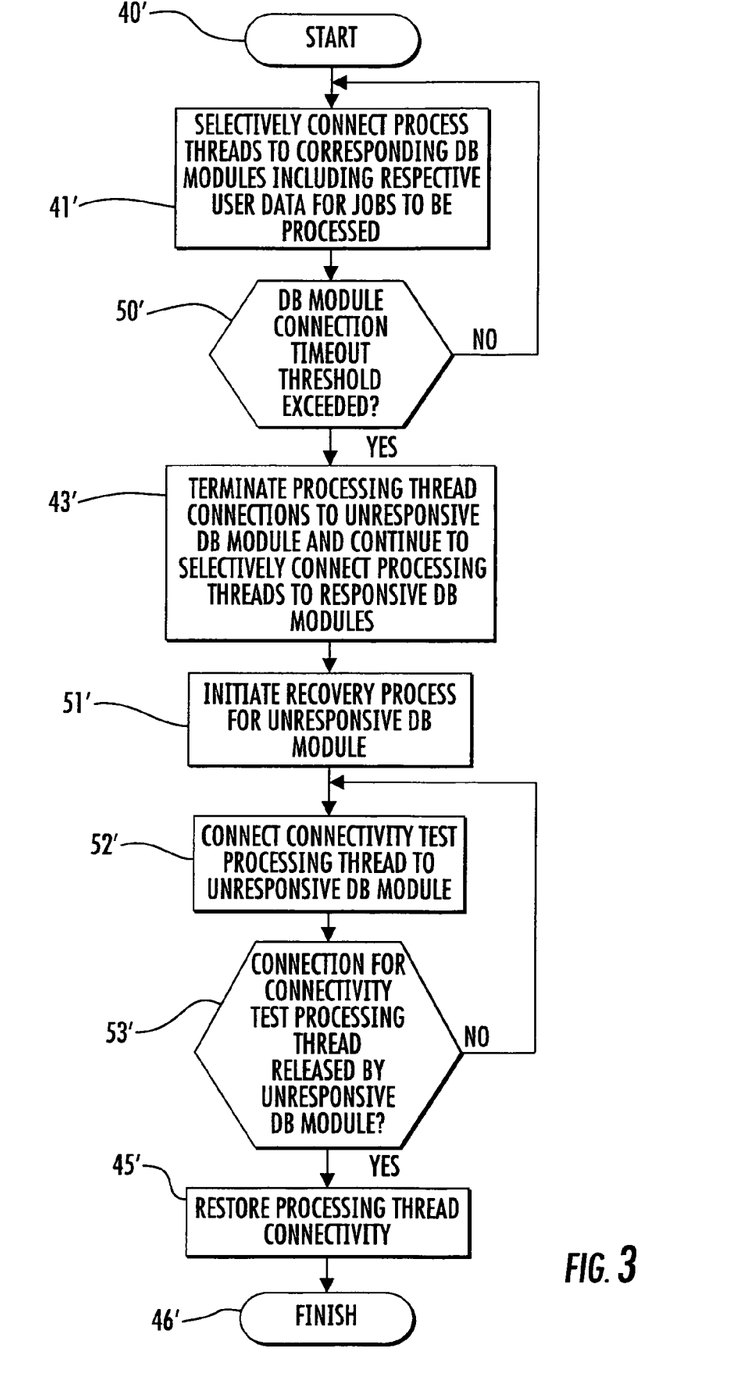

The operational aspects of the database pool module 30 will now be further described with reference to FIGS. 2 and 3. Beginning at Block 40, during normal operation the database pool module 30 selectively connects processing threads 29a-29n to the corresponding database modules 26a-26n that include the respective user data for the jobs to be processed, at Block 41. Thus, for example, if processing thread 29a requires access to information for a user that is assigned to the database module 26a, then the database pool module 30 will open a connection between the two in response to a request by the processing thread for access to the database module.

However, while connecting processing threads 29a-29n to the corresponding database modules 26a-26n during normal operation, the database pool module 30 also performs monitoring operations to determine when a database module becomes unresponsive, at Block 42. More particularly, the database pool module 30 may determine unresponsiveness by monitoring connections between the processing threads 29a-29n and database modules 26a-26n and determining when a connection timeout threshold for a given database module has been exceeded, at Block 50'. That is, when the connection timeout threshold has been exceeded, it means that the given database module 26 has not processed the operation requested by the corresponding processing thread 29 and released the connection back to the pool. By way of example, the connection timeout threshold may be on the order of a few minutes, preferably greater than about three minutes, and, more preferably, about five minutes, although other timeout thresholds may also be used.

Once the database pool module 30 makes a determination that a given database module 26 is unresponsive, the database pool module terminates processing thread connections to the unresponsive database module, at Block 43. More particularly, the database pool module 30 may terminate all open connections to the unresponsive database 26, although in some embodiments one or more connections may be left open, as will be discussed further below In the meantime, the database pool module 30 preferably continues to selectively connect processing threads 29a-29n to database modules 26a-26n that are responsive, so that only processing jobs requiring the unresponsive database module(s) are delayed (Block 43'). That is, the database pool module 30 helps keep processing threads 29a-29n and database module connections from being wasted on an unresponsive database module 26, and instead keeps these resources directed to processing jobs that can be completed, as will be appreciated by those skilled in the art.

Moreover, the database pool module 30 may further advantageously initiate a recovery process for the unresponsive database module 26, at Block 51'. By way of example, recovery processes operations that the database pool module 30 may initiate may include a re-boot or re-initialization of the unresponsive database module software, sending a notification to a system administrator, etc.

The database pool module 30 also continues to monitor the status of the unresponsive database module 26 to determine when it becomes responsive again, at Block 44. In particular, after terminating processing thread connections to a given database module 26 after it is determined that the given database is unresponsive, the database pool module 30 may allow a connectivity test processing thread 29 to be connected to the unresponsive database module, at Block 52'. By way of example, this connectivity test processing thread could be the next thread 29 that attempts to open a connection to the unresponsive database, which the database pool module allows so that it can determine whether the unresponsive database module 26 releases the connection, at Block 53'. If this happens, it means that the given database module 26 has again become responsive, and the database pool module 30 can restore full (or increased) processing thread connectivity thereto, at Block 45, thus concluding the illustrated method (Block 46). Of course, the database pool module 30 could allow an existing connection to remain open as the connectivity test processing thread (e.g., the last thread connected) rather than terminating all thread connections and then opening a new one in some embodiments.

Otherwise, when the connectivity test processing thread connection times out, the database pool module may repeat connecting another connectivity test processing thread to the unresponsive database 26 and monitor the connection status thereof until a connection is finally released. The connectivity test processing thread need not be an actual job thread 29 from the processing module 25 in all embodiments. That is, the database pool module 30 may also have one or more processing threads that it uses for connectivity test purposes.

It should be noted that the various modules of the computer server system 21 may be implemented using both hardware and software components. Moreover, these components may be included in a single server, or distributed among a plurality of servers. Thus, although shown separately for clarity of illustration, the processing module 25 and database pool module 30 may share the same hardware processing components Moreover, the computer server system 21 is also scaleable, i.e., more than one processing module 25 and database pool module 30 may be used in different embodiments Turning now to FIG. 4, further operational aspects of an email ready server system including a plurality of database pools will be understood with reference to an exemplary implementation thereof. To prevent processing threads from being blocked on a pool for an extended amount of time, a timeout threshold is introduced that is large enough such that a query on a "working" connection will not be interrupted, yet will help ensure that the component will recover in a finite amount of time. A connection pool has two states, namely a working (or responsive) state, and a recovering (or unresponsive) state.

Figure 4:
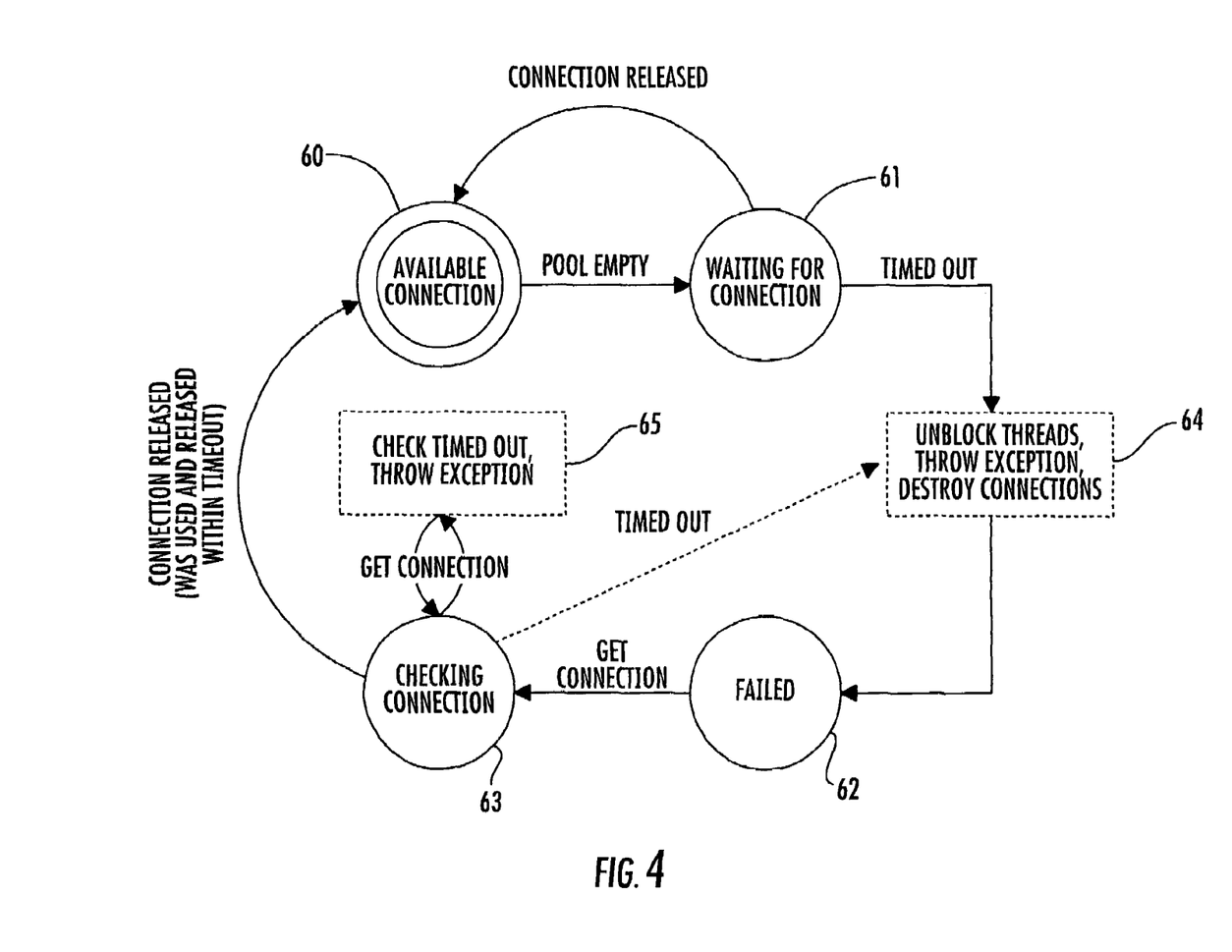
FIG. 4 is a state diagram illustrating exemplary operational states of the computer server system of FIG. 1.

The connection pool state diagram shown in FIG. 4 has two working states, namely an available connection state 60 and a waiting for connection state 61. There are also two recovering states, namely a failed state 62 and a checking connection state 63. Initially, all pools are in a working state. A pool transitions from working to recovering if all connections in the pool have been blocked for the timeout period. At this time all threads will be unblocked, exceptions thrown, and all connections disposed of, at Block 64. Once in the recovering state, preferably only one request at a time is processed and a new connection is used. For all other requests an exception will be thrown, at Block 65. The transition back to a working state occurs when a connection has been used and returned to the pool within the timeout period (i.e., five minutes). The states are further described in Table 1, below.

TABLE 1

| State | Description |
| --- | --- |
| Available Connection | The pool is working and has available connections, which may or may not have been created yet. |
| Waiting for Connection | The pool is empty and all requests must wait for an available connection. If the wait period for next available connection is exceeded then all threads are unblocked, exceptions are thrown, and connections destroyed and the system goes to the Failed state. If a connection is released before the wait period expires then the system returns to the available connection state where the connection is given to the next thread. If there are more threads still waiting then the system goes back to the Waiting for connection state where the timeout period restarts. |
| Failed | The pool has failed and the system is passively waiting for the next sacrificial thread for which the system will give a new connection and enter the Checking Connection state. |
| Checking Connection | The pool has failed and the system is waiting for a successful use of a single connection. If a connection is released within the timeout period then the system returns to the Available Connection state. If another thread tries to grab a connection and the timeout period has elapsed then the connection will be destroyed, exceptions returned and the state changes back to fail where the system waits for another sacrificial thread. |

Various data members and constants may be used to track and manage state transitions, examples of which are provided in Table 2, below

TABLE 2

| Type | Name | Description |
|---|---|---|
| Long | m_lastgrabbedTime | Records the time the last connection was grabbed from the pool. |
| Long | m_poolTimeout | Allowed time that the entire pool can be busy before failing. |
| Byte | m_poolState | State of the pool, either working or recovering. Initial value = WORKING |
| byte final static | POOL_STATE_WORKING | Value of m_poolState when it is functioning normally. |
| byte final static | POOL_STATE_RECOVERING | Value of m_poolState when no connections have been available for the timeout period. |

Exemplary pseudo code for implementing the above-described example is provided below. The first code portion (Code Portion 1) is for getting connections, the second code portion (Code Portion 2) is for allocating new connections, and the third code portion (Code Portion 3) is for releasing connections back to the pool once a database has been restored.

Code Portion 1

```
if (m_poolState==POOL_STATE_WORKING)
{
   while (no connection available)
   {
      pool timedout = wait(CurrentTime ( )-
(m_lastgrabbedTime+m_poolTimeout));
      if (m_poolState==POOL_STATE_FAILED)
      {
         throw new TimedOutException( );
      }
      else if (timedout && no connection available)
      {
         m_poolState=POOL_STATE_FAILED;
         notifyAll( );
         destroyConnections( );
         throw new TimedOutException( );
      }
   }
   if (there are no free connections)
   {
     try
     {
        connection = allocateNewConnection( );
     }
     catch (Exception e)
     {
        m_poolState=POOL_STATE_FAILED;
        notifyAll( );
        destroyConnections( );
        throw new Exception( );
     }
   }
   else
   {
      Connection = grab a connection from free list.
   }
```

```
   m_lastgrabbedTime=CurrentTime( );
   return connection; //either from free list or create one
}
else // POOL_STATE_RECOVERING
{
   if (no connections busy)
   {
      try
      {
         connection = allocateNewconnection( );
         add connection to busy list.
         m_lastgrabbedTime=CurrentTime( );
      }
      catch (Exception e)
      {
         throw new Exception( );
      }
   }
   else
   {
      pool timedout =
CurrentTime( )>=m_lastgrabbedTime+m_poolTimeout;
      if (timedout)
         destroyConnections ( );
      throw new TimedOutException ( );
   }
}
```

Code Portion 2

```
//Make sure that connection creation does not block forever by
introducing a //timeout.
//Use the pool timeout as the login timeout for creating a new
connection.
loginTimeout = poolTimeout;
DriverManager.setLoginTimeout(loginTimeout);
//Subtract time it took to login from timeout value and use remaining
//time as the timeout for validating the connection.
startTime = current time;
connection = DriverManager.createConnection( );
timeToLogin = current time - startTime;
validateconnection(connection, (timeout - timeToLogin));
```

Code Portion 3

```
if (!isBad)
{
   return connection to pool
   m_poolState=POOL_STATE_WORKING;
}
notify( ); //no one waiting in RECOVERY state.
```

Exemplary components of a hand-held mobile wireless communications device 1000 that may be used in accordance the system 20 are further described in the example below with reference to FIG. 5. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures) The keypad may include a mode selection key, or other hardware or software for switching between text entry and telephony entry.

Figure 5:
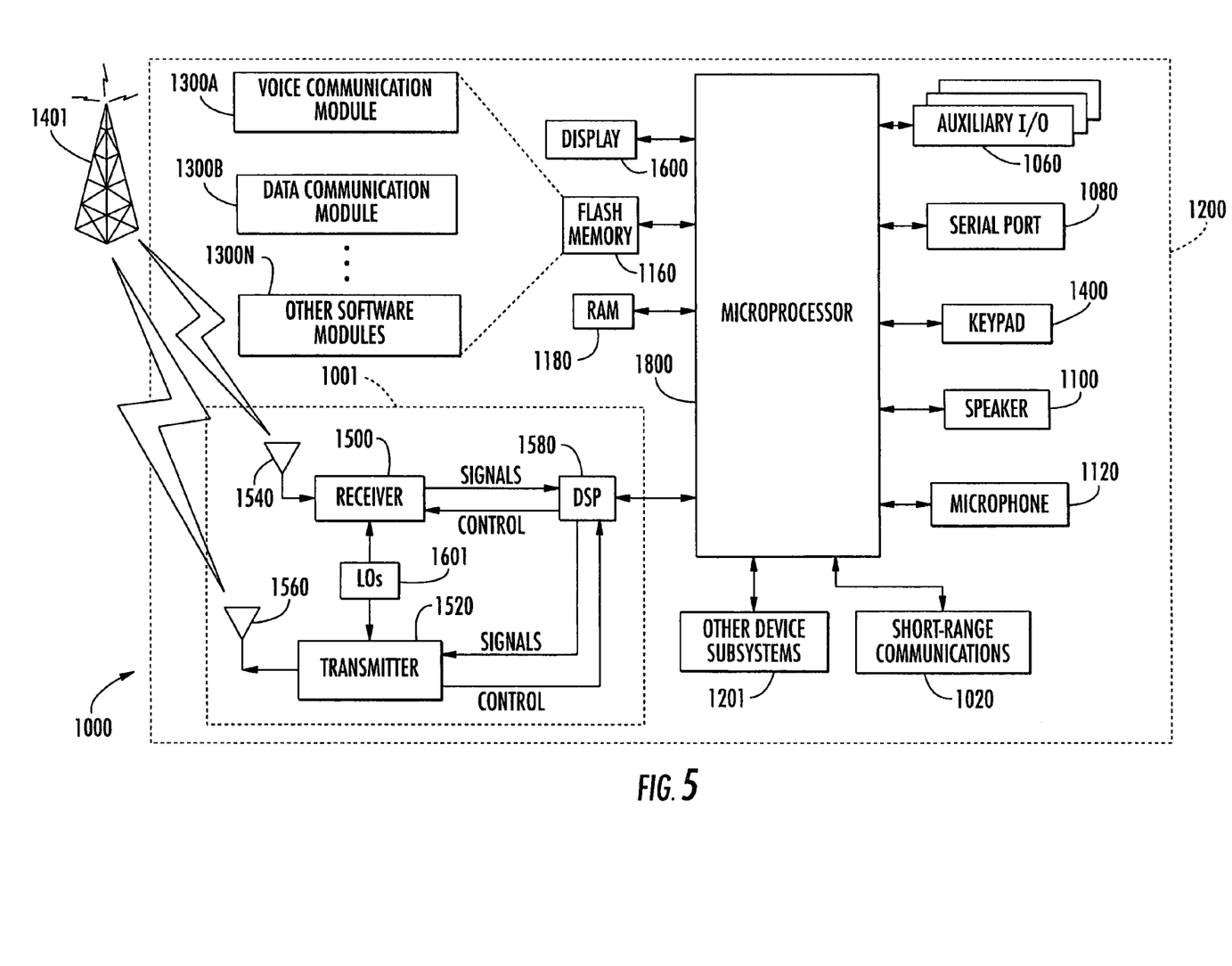
FIG. 5 is a schematic block diagram illustrating exemplary components of a mobile wireless communications device for use with the system of FIG. 1.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A computer server system comprising:
a relay server comprising
a plurality of database modules for storing user data for a plurality of users;
at least one processing module comprising a plurality of processing threads for processing jobs for users based upon respective user data; and
a database pool module connected between said plurality of database modules and said at least one processing module for
selectively connecting said processing threads to corresponding database modules including respective user data for jobs to be processed,
determining when a database module becomes unresponsive and terminating processing thread connections to said unresponsive database module based thereon,
determining when said unresponsive database module becomes responsive by connecting a connectivity test processing thread to said unresponsive database module, and
determining if the connection for said connectivity test processing thread is released by said unresponsive database module and restoring processing thread connectivity thereto based thereon.

2. The computer server system of claim 1 wherein said database modules comprise email database modules.

3. The computer server system of claim 1 wherein said database pool module continues to selectively connect said processing threads to responsive database modules while said unresponsive database module remains unresponsive.

4. The computer server system of claim 1 wherein said database pool module further initiates a recovery process for said unresponsive database module.

5. The computer server system of claim 1 wherein said database pool module determines database module unresponsiveness based upon a connection timeout threshold.

6. The computer server system of claim 5 wherein the connection timeout threshold is greater than about three minutes.

7. The computer server system of claim 1 wherein said processing threads process user electronic mails (email) jobs.

8. A communications system comprising:
a computer server system comprising
a plurality of database modules for storing user data for a plurality of users,
at least one processing module comprising a plurality of processing threads for processing jobs for users based upon respective user data, and
a database pool module connected between said plurality of database modules and said at least one processing module for
electively connecting said processing threads to corresponding database modules including respective user data for jobs to be processed,
determining when a database module becomes unresponsive and terminating processing thread connections to said unresponsive database module based thereon,
determining when said unresponsive database module becomes responsive by connecting a connectivity test processing thread to said unresponsive database module, and
determining if the connection for said connectivity test processing thread is released by said unresponsive database module and restoring processing thread connectivity thereto based thereon;
a wireless communications network; and
a plurality of wireless communications devices each associated with a respective user for receiving job results from said processing threads via said wireless communications network.

9. The communications system of claim 8 wherein said database modules comprise email database modules.

10. The communications system of claim 8 wherein said database pool module continues to selectively connect said processing threads to responsive database modules while said unresponsive database module remains unresponsive.

11. The communications system of claim 8 wherein said database pool module further initiates a recovery process for said unresponsive database module.

12. The communications system of claim 9 wherein said database pool module determines database module unresponsiveness based upon a connection timeout threshold.

13. The communications system of claim 9 wherein said wireless communications network comprises a cellular communications network.

14. The communications system of claim 8 wherein said processing threads process user electronic mails (email) jobs.

15. A method for accessing a plurality of database modules for storing user data for a plurality of users, the method comprising:
providing a plurality of processing threads in a computer server for processing jobs for users based upon respective user data;
selectively connecting processing threads to corresponding database modules including respective user data for jobs to be processed;
determining when a database module becomes unresponsive and terminating processing thread connections to the unresponsive database module based thereon;
determining when the unresponsive database module becomes responsive by connecting a connectivity test processing thread to the unresponsive database module; and
determining if the connection for the connectivity test processing thread is released by the unresponsive database module and restoring processing thread connectivity thereto based thereon.

16. The method of claim 15 further comprising continuing to selectively connect the processing threads to responsive database modules while the unresponsive database module remains unresponsive.

17. The method of claim 15 further comprising initiating a recovery process for the unresponsive database module.

18. The method of claim 15 wherein determining database module unresponsiveness comprises determining database module unresponsiveness based upon a connection timeout threshold.

19. The method of claim 15 wherein the processing threads process user electronic mails (email) jobs.

20. A computer-readable medium having computer-executable modules comprising:
a plurality of database modules for storing user data for a plurality of users;
at least one processing module comprising a plurality of processing threads for processing jobs for users based upon respective user data; and
a database pool module connected between said plurality of database modules and said at least one processing module for selectively connecting said processing threads to corresponding database modules including respective user data for jobs to be processed, determining when a database module becomes unresponsive and terminating processing thread connections to said unresponsive database module based thereon, determining when said unresponsive database module becomes responsive by connecting a connectivity test processing thread to said unresponsive database module, and determining if the connection for said connectivity test processing thread is released by said unresponsive database module and restoring processing thread connectivity thereto based thereon.

21. The computer-readable medium of claim 20 wherein said database pool module continues to selectively connect said processing threads to responsive database modules while said unresponsive database module remains unresponsive.

22. The computer-readable medium of claim 20 wherein said database pool module further initiates a recovery process for said unresponsive database module.

23. The computer-readable medium of claim 20 wherein said database pool module determines database module unresponsiveness based upon a connection timeout threshold.

24. The computer-readable medium of claim 20 wherein said processing threads process user electronic mails (email) jobs.

* * * * *